(12) United States Patent
Jeffries et al.

(10) Patent No.: US 6,453,386 B1
(45) Date of Patent: Sep. 17, 2002

(54) METHOD AND SYSTEM FOR PERFORMING VARIABLE AGING TO OPTIMIZE A MEMORY RESOURCE

(75) Inventors: Clark Debs Jeffries, Durham; Piyush Chunilal Patel, Cary; Gail Irene Woodland, Chapel Hill, all of NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/409,574

(22) Filed: Sep. 30, 1999

(51) Int. Cl.[7] ............................................... G06F 12/00
(52) U.S. Cl. ......................... 711/133; 711/136; 711/160
(58) Field of Search ................................. 711/133, 135, 711/136, 159, 160

(56) References Cited

U.S. PATENT DOCUMENTS

| 3,541,529 | A | | 11/1970 | Nelson ..................... 340/172.5 |
|---|---|---|---|---|
| 4,437,155 | A | * | 3/1984 | Sawyer et al. ............... 364/200 |
| 4,530,055 | A | | 7/1985 | Hamstra et al. ............. 364/200 |
| 5,043,885 | A | | 8/1991 | Robinson .................... 364/200 |
| 5,479,642 | A | | 12/1995 | Jarvis ......................... 395/471 |
| 5,497,477 | A | | 3/1996 | Trull .......................... 395/460 |
| 5,553,264 | A | | 9/1996 | Özveren et al. ............. 395/462 |
| 5,555,399 | A | | 9/1996 | Waldron et al. ............. 395/486 |
| 5,594,886 | A | | 1/1997 | Smith et al. ................. 395/463 |
| 5,619,675 | A | * | 4/1997 | De Martine et al. ......... 711/133 |
| 5,778,430 | A | | 7/1998 | Ish et al. ..................... 711/133 |
| 5,802,571 | A | * | 9/1998 | Konigsburg et al. ......... 711/143 |
| 6,105,111 | A | * | 8/2000 | Hammarlund et al. ...... 711/136 |
| 6,163,773 | A | * | 12/2000 | Kishi .......................... 706/16 |

OTHER PUBLICATIONS

IBM Technical Disclosure Bulletin, "Multi–Section Method for Data Cache Management," vol. 33, Issue No. 12, pp 357–359, May 1991.*

* cited by examiner

Primary Examiner—Matthew Kim
Assistant Examiner—Stephen Elmore
(74) Attorney, Agent, or Firm—Janyce Mitchell; Sawyer Law Group (57) ABSTRACT

A method and system for performing aging of a memory in a computer system is disclosed. The memory contains a plurality of items. The method and system include purging the memory of a portion of the plurality of items each time an epoch equal to an aging variable has expired. The method and system further include providing the aging variable for a new epoch based on a performance of the memory in a previous epoch, including the aging variable of the previous epoch.

23 Claims, 7 Drawing Sheets

Prior Art

METHOD AND SYSTEM FOR PERFORMING VARIABLE AGING TO OPTIMIZE A MEMORY RESOURCE

FIELD OF THE INVENTION

The present invention relates to memory usage in a computer system and more particularly to a method and system for providing a variable aging interval for aging a memory resource.

BACKGROUND OF THE INVENTION

Figure 1:
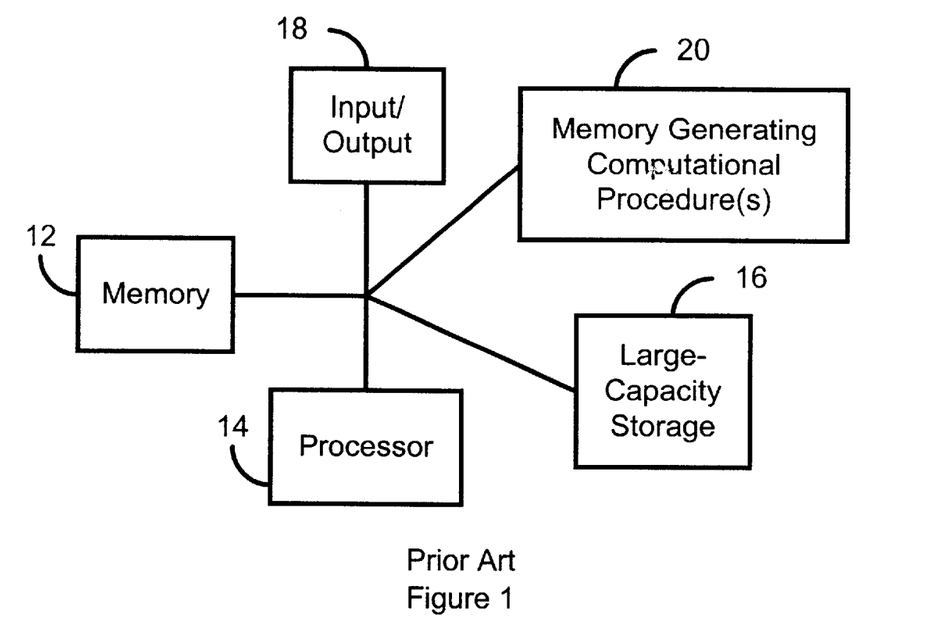
FIG. 1 is a block diagram of a computer system.

FIG. 1 depicts a simplified block diagram of a portion of a computer system 10. The computer system includes a memory 12, a processor 14, a large capacity storage 16, an input/output mechanism 18, such as a keyboard, monitor or network, and a computation procedure for generating memories 20. The memory 12 is used to temporarily store items which may be used by the processor 14 in performing various tasks. Typically, when the processor 14 requires an item, the memory 12 is searched first. If the item is found in the memory 12, the item is provided directly to the processor 14. When an item that is searched for is not found in the memory 12, the item is typically found by searching the large capacity storage 16, or other by other means. The new item is generally provided to the memory 12 and the processor 14. Alternatively, a new memory is computed by some procedure 20, such as generation of a forwarding table. Thus, if the processor 14 requires the item again, the memory 12 may contain the item.

Items stored in the memory 12 are desired to be rapidly and easily accessible by the processor 14. Items stored in the memory 12 can be more rapidly retrieved than items stored in the large capacity storage 16. Similarly, items stored in the memory 12 can be more rapidly retrieved than items recomputed by some procedure 20, such as generation of a forwarding table. Thus, the memory 12 may be a cache. In order for the interaction between the memory 12 and the processor 14 to be efficient, the memory 12 is made relatively small. Consequently, the memory 12 is typically much smaller than the large capacity storage 16. Memory retrieval from the memory 12 is also much faster than recomputation. The small size of the memory 12 reduces unnecessary delay in retrieving items in the memory 12.

Furthermore, the full capacity of the memory 12 is not desired to be used. If the memory 12 becomes full it is difficult to store additional items. Thus, the occupancy of the memory 12 is desired to be below the maximum possible occupancy. In addition, when fewer items are stored in the memory 12, the problem of finding a location to store new items is simplified. The search of the memory 12, therefore, consumes less time. Thus, the memory 12 and processor 14 can operate more efficiently.

Furthermore, it is desirable for the hit ratio to be relatively large. The hit ratio is the ratio of the number of times a search in the memory 12 results in the desired item being found to the total number of times the memory 12 is searched. If the hit ratio is relatively high, then the memory 12 is storing those items that are repeatedly used. However, as discussed above, the occupancy of the memory 12 should still remain below the maximum occupancy in order to improve the speed of accessing to the memory 12 or adding new items to the memory 12.

One of ordinary skill in the art will readily realize that without management, the efficiency of the memory 12 may not be maintained. As discussed above, a large hit ratio, a small size, and a relatively low occupancy are generally desired for the memory 12. These are competing goals. A larger memory 12 having a higher occupancy stores more items, allowing for a larger hit ratio. However, a small memory 12 with a relatively low occupancy has a high speed. As the size of the memory 12 decreases, it becomes more important to store only those items which will be reused by the system 10 in order to preserve a higher hit ratio. Furthermore, items that the processor 14 cannot find in the memory 12 are stored in the memory 12 when the items are found, either being recalled from the large capacity memory 16 or generated by the computation procedure 20. Unchecked, the memory 12 may become full, unable to store additional items, and function improperly. Items stored in the memory 12 may also become seldom used or may never be used again. These items may unnecessarily clutter the memory 12. Thus, some mechanism for managing, or aging, the memory 12 is used to attempt to improve the efficiency of the memory 12.

There are many conventional mechanisms for aging the memory 12. One conventional mechanism keeps the memory 12 relatively full, discarding the least recently used item for additional space. Other conventional mechanisms use variations of purging the least recently used items or purging the memory 12 when the memory 12 is full or almost full. However, in such a case, the occupancy of the memory 12 is relatively high, making it difficult to store additional items. Thus, another mechanism is often used for managing the memory 12.

Figure 2A:
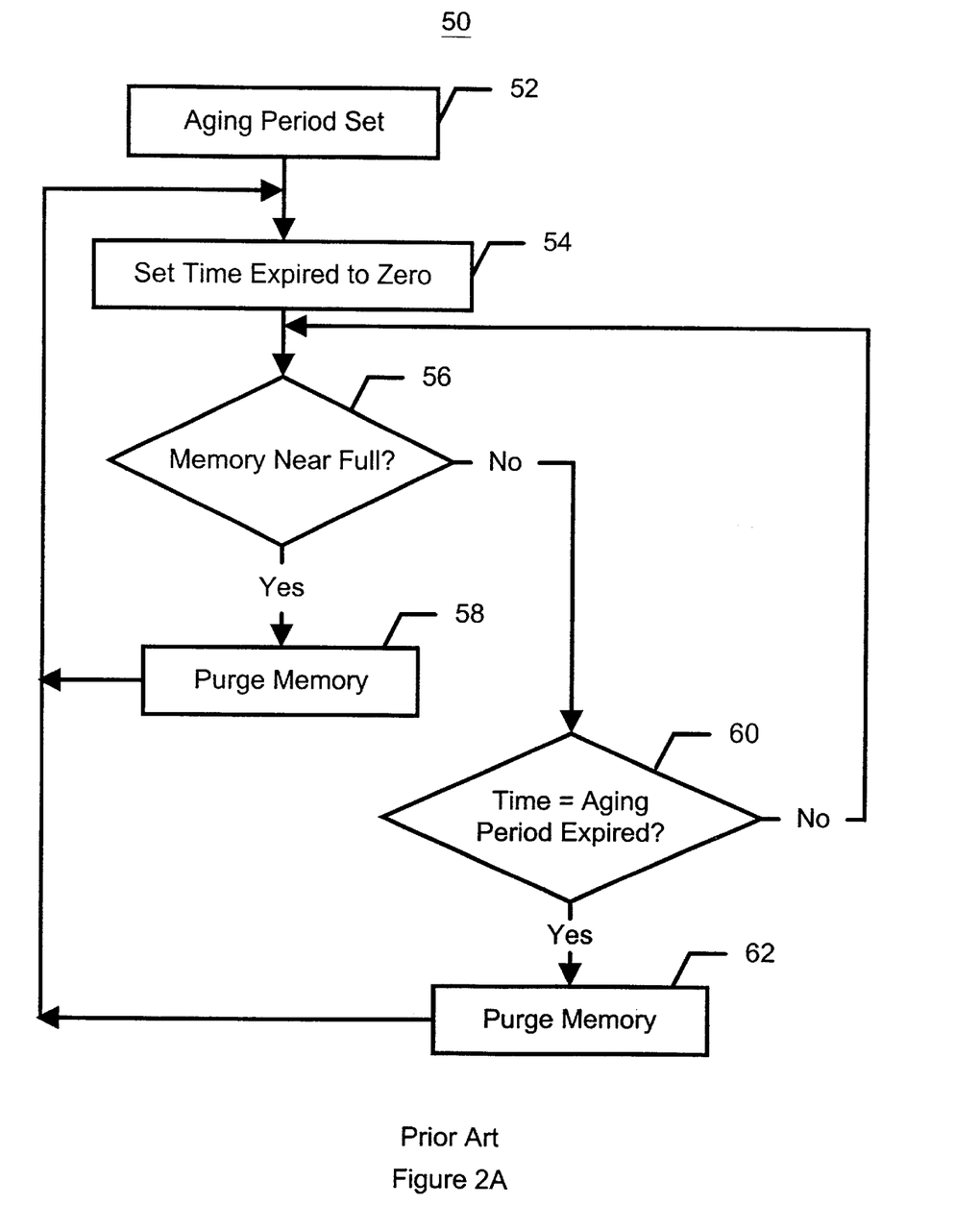
FIG. 2A is a flow chart depicting a conventional method for purging a memory.

FIG. 2A depicts one conventional method 50 for purging the memory 12 periodically in order to age the memory 12. A purge of the memory removes some of the items of the memory 12, for example those items not sought since the previous purge and not added during the same time period, or epoch. A conventional aging period, which sets the time between purges of the memory 12, is set, via step 52. An epoch for the memory is a time equal to the conventional aging period. The time since the last purge is then set to zero, via step 54. It is determined whether the memory is near full, via step 56. If so, then the memory 12 is purged immediately, via step 58. Steps 56 and 58 allow for accelerated purging of the memory 12. Accelerated purging helps prevent the memory 12 from becoming full. Step 54 is then returned to.

If it is determined in step 56 that the memory is not nearly full, then it is determined if the current epoch is completed, via step 60. In other words, it is determined whether a time equal to the conventional aging period has expired, via step 60. If the time equal to the conventional aging period has not expired, then step 56 is returned to. If it is determined that the current epoch has expired, then the memory is purged, via step 62. Step 54 is then to returned to.

Thus, the conventional method 50 periodically removes items from the memory 12 at the end of each epoch, for example those items not referenced and not added during the just completed epoch. The conventional aging period is typically set by a user, such as a network administrator. The network administrator typically sets the conventional aging period based on the network administrator's experience or knowledge of the computer system 10. The memory 12 is purged upon expiration of each conventional aging period.

Figure 2B:
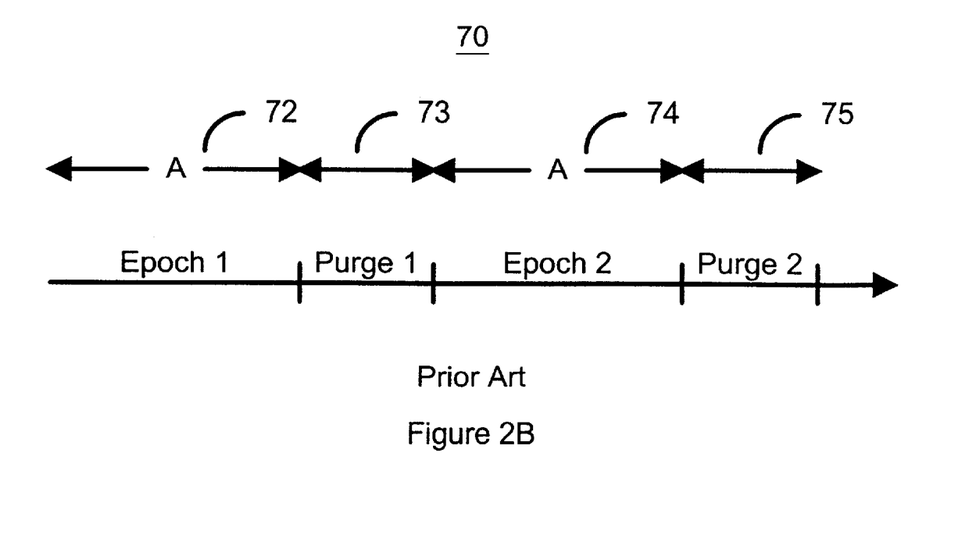
FIG. 2B is a diagram of a time line for operation of the computer system using the conventional method depicted in FIG. 2A.

FIG. 2B depicts a time line 70 for the conventional method 50. The conventional aging period, A, defines the lengths of the epochs 72 and 74. Each epoch 72 and 74 is followed by a purge 73 and 75, respectively. Additional epochs (not shown) and purges (not shown) follow during operation of the computer system 10 using the conventional method 50. Thus, the conventional aging period sets the time between the end of one purge and the beginning of a subsequent purge. During a purge 73 or 75, the memory 12 is typically unavailable for other operations.

Referring to FIGS. 2A and 2B, the purging steps 58 and 62 are conventionally carried out in a number of ways. Some conventional systems simply delete all of the items in the memory 12 when the memory 12 is full instead of relying on the conventional aging period. Thus, steps 58 and 62 could purge all or merely some of the items in the memory 12. In one conventional method 50, the number of items purged in step 58 and 62 is a function of the occupancy of the memory 12. When the memory 12 is nearly full, a larger number of items are deleted during the purging steps. When the memory 12 is closer to being empty, fewer items are deleted in the purging steps. In another conventional method, the items in the memory 12 are put into classes based on usage or recent addition to memory. Items are deleted based on the class.

Thus, the memory 50 periodically removes items from the memory 12. Consequently, the occupancy of the memory 12 can be lowered and the hit ratio of the memory 12 may be raised. Although the conventional method 50 functions, one of ordinary skill in the art will readily realize that the conventional method may be inefficient. During normal operation, the conventional method depends largely upon the conventional aging period set by the system administrator. Furthermore, purging the memory 12 based solely on the occupancy or on the class of the items stored in the memory may adversely affect the performance of the memory 12. Thus, the rate at which the memory 12 is purged may be higher or lower than is desirable. Purging less often than is desirable leaves more items in the memory 12 than is desired, slowing the time required to find an item that is used or complicating insertion of new items. Purging the memory 12 more often than is desired also slows the system 10 because each purge requires a certain amount of time and might prevent the memory 12 from being used during this time. In addition, deleting an item prematurely means that the item will have to be added again the next time the item is sought. Furthermore, the number of purged items may be different from what is desired. As a result, the conventional memory 12 functions in less efficient manner than is desired.

Accordingly, what is needed is a system and method for aging the memory of the computer system to account for the behavior of the memory. The present invention addresses such a need.

SUMMARY OF THE INVENTION

The present invention provides a method and system for performing aging of a memory in a computer system. The memory contains a plurality of items. The method and system comprise purging the memory of a portion of the plurality of items each time an epoch equal to an aging variable has expired. The method and system further comprise providing the aging variable for a new epoch based on a performance of the memory in a previous epoch, including the aging variable of the previous epoch.

According to the system and method disclosed herein, the present invention provides a mechanism for updating the aging the memory of a computer system based on the performance of the computer system.

DETAILED DESCRIPTION OF THE INVENTION

The present invention relates to an improvement in aging policy of memories in computer systems. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown, but is to be accorded the widest scope consistent with the principles and features described herein.

A computer system, such as the computer system 10 depicted in FIG. 1, can contain a memory 12 that is used to allow the processor 14 to rapidly access information stored in the memory 12. The memory 12 is generally relatively small in size and has a relatively low occupancy in order to improve its speed. However, it is also desirable for the memory 12 to have a relatively high hit ratio. The hit ratio is the ratio of the number of times the processor 14 searches the memory 12 and finds the desired item to the number of times the memory 12 is searched. Although a maximum hit ratio of one is not normally observed, a high hit ratio is desired. Reducing the size and occupancy of the memory 12 and providing a high hit ratio are competing goals. Consequently, some mechanism for managing the memory 12 is typically used.

Conventional methods for aging the memory 12 are employed to manage the memory 12. In one conventional method, the memory 12 is purged at set intervals, known as epochs. The duration of an epoch is the conventional aging period, which is typically a constant set by a network administrator. After each epoch expires, the memory 12 is purged. Thus, a portion of the items in the memory 12 is removed at set intervals.

Although the conventional method for purging the memory 12 can work, one of ordinary skill in the art will readily realize that the conventional method may not adequately account for changes in the computer system 10. For example, purging too often reduces the efficiency of the memory 12 because too much time is consumed in repeated and unnecessary purges of the memory. Purging too seldom or purging too few items can allow the occupancy of the memory 12 to increase beyond what is desired. Consequently, more efficient methods of managing the memory 12 continue to be desired.

The present invention provides a method and system for performing aging of a memory in a computer system. The memory includes a plurality of items. The method and system comprise purging the memory of a portion of the plurality of items each time an epoch equal to an aging variable has expired. The method and system further comprise providing the aging variable for a new epoch based on a performance of the memory in a previous epoch, including the aging variable of the previous epoch.

The present invention will be described in terms of a particular method for determining the aging variable. However, one of ordinary skill in the art will readily recognize that this method and system will operate effectively for other methods which are consistent with the specification. For clarity, the present invention will also be described in the context of the system 10 depicted in FIG. 1. However, one of ordinary skill in the art will readily realize that the present invention will operate effectively for other systems using a memory, such as the memory 12, for temporary storage.

Figure 3:
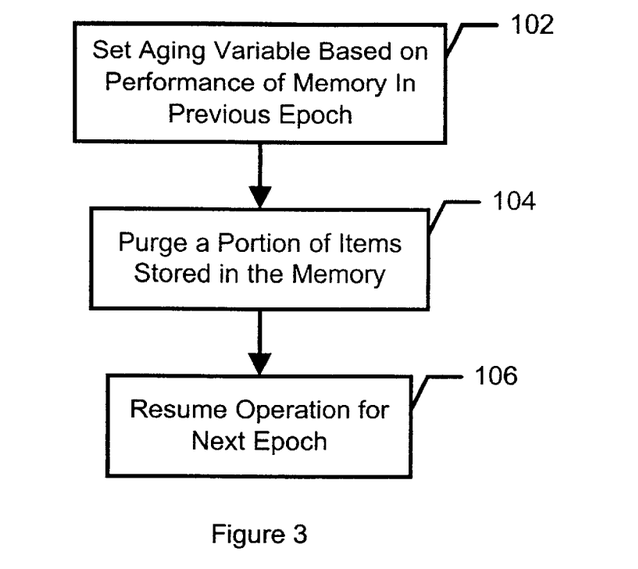
FIG. 3 is a flow chart depicting one embodiment of a method in accordance with the present invention for managing a memory.

To more particularly illustrate the method and system in accordance with the present invention, refer now to FIG. 3, depicting one embodiment of a method 100 in accordance with the present invention. The method 100 may be performed for the system 10 or another analogous system having a memory to be managed. The method 100 is preferably carried out using a combination of software and the hardware in the system 10, such as the processor 14 and the memory 12 shown in FIG. 1. Referring now to FIGS. 1 and 3, an aging variable for the memory 12 during an epoch is set based on the performance of the memory 12 in a previous epoch, via step 102. The previous epoch is preferably the most recently completed epoch. The aging variable sets the time that a corresponding epoch lasts. The memory 12 is also purged to remove a portion of the items in the memory 12, via step 104. The purge performed in step 104 preferably removes the items which were not used in the previous epoch. Note that if all of the items in the memory 12 were used in the previous epoch, the portion of the items removed in step 104 is a null set. Once the aging variable is calculated and the memory 12 purged, the memory 12 resumes operation for the next epoch using the new aging variable, via step 106. The steps 102, 104, and 106 are repeated during operation of the memory 12.

Because the aging variable depends upon the performance of the memory 12 in the previous epoch, the aging variable can change to optimize operation of the memory 12. For example, the aging variable may change based upon the hit ratio, the change in the hit ratio, the occupancy of the memory 12, or other factors. Thus, the length of time that a particular epoch lasts can change to adapt to the behavior of the system 10. For example, the aging variable may adapt to the tasks which increase or decrease the usage of the memory 12 by the processor 14. As a result, performance of the memory 12 may be improved. Furthermore, overall performance of the system 10 is improved. For example, adding items to or deleting items from the memory 12 costs processor cycles, adversely affecting performance of the system 10. Deleting an item prematurely means that the item will be added again. Changing the aging variable to optimize operation of the memory 12 results in fewer inappropriate deletions and additions. Consequently, overall performance of the system 10 can be improved.

Figure 4:
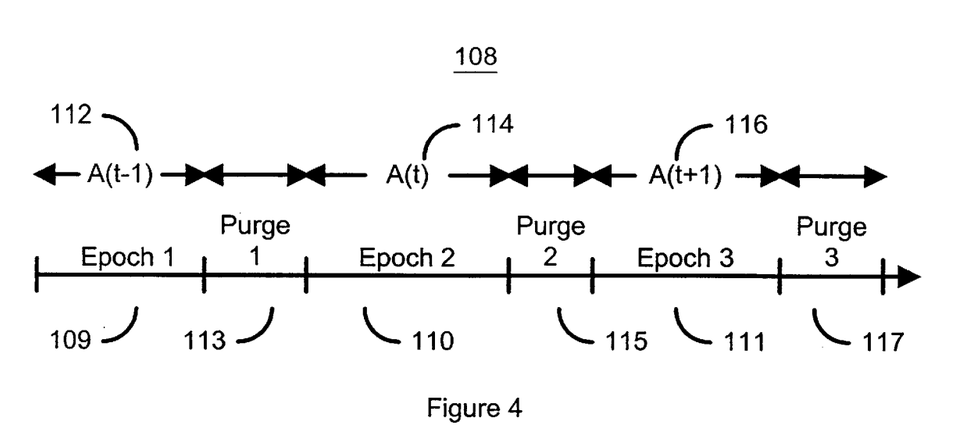
FIG. 4 depicts a time line for operation of the computer system using the embodiment of the method in accordance with the present invention depicted in FIG. 3.

FIG. 4 depicts a time line 108 for operation of a computer system, such as the computer system 10, using the method 100 in accordance with the present invention. Three epochs 109, 110 and 111 are depicted. The epochs 109, 110 and 111 have corresponding aging variables A(t−1) 112, A(t) 114 and A(t+1) 116, respectively. As depicted, the aging variable A(t−1) 112, A(t) 114 and A(t+1) 116 for each epoch 109, 110, and 111 can change. The aging variable A(t) 114 depends upon the performance of the memory 12 during the epoch 109 corresponding to the aging variable A(t−1) 112. The aging variable A(t+1) 116 depends upon the performance of the memory 12 during the epoch 110 corresponding to the aging variable A(t) 114. Each epoch 109, 110 and 111 is followed by a purge 113, 115 and 117, respectively. The length of the purge 113, 115, or 117 may change depending upon the number of items to be deleted in a particular purge. In a preferred embodiment, the memory 12 cannot be used for other tasks during a purge. Also depicted in the time line 108 are the times at which various quantities which may be used in determining the aging variables A(t) 114 and A(t+1) 116 are determined. For example, the hit ratio, h(t−1) of the memory 12 for the epoch 109 may be determined at the end of the epoch 109, which roughly coincides with the commencement of the purge 113. The determination of the occupancy of the memory 12, C(t−1), during the epoch 109 could be determined at end of the epoch 109 or at the end of the purge 113. Similarly, the hit ratio, h(t), of the memory 12 for the epoch 110 may be determined at the end of the epoch 110, which roughly coincides with the commencement of the purge 115. The determination of the occupancy of the memory 12, C(t), during the epoch 110 could be determined either at end of the epoch 110 or at the end of the purge 115. However, the time at which the occupancy of the memory 12 is determined should remain consistent from epoch to epoch.

Figure 5A:
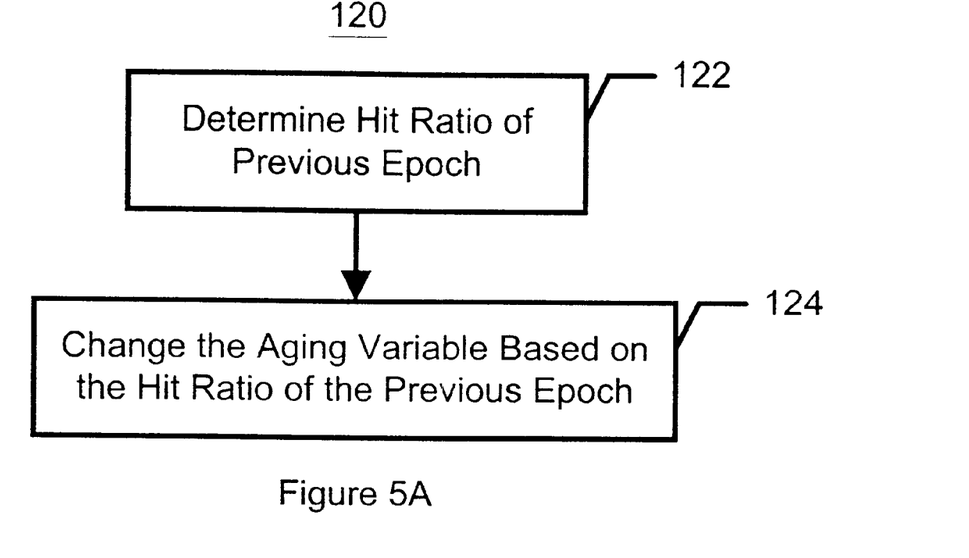
FIG. 5A depicts one embodiment of a method in accordance with the present invention for determining the aging variable.

Referring back to FIG. 3, step 102 determines an aging variable for a particular epoch based on the performance of the memory 12 during a previous epoch. Step 102 could be performed in a number of ways. FIGS. 5A through 5D are flow charts depicting embodiments of methods for determining the aging variable for a particular epoch. Referring to FIG. 5A, a first method 120 for determining the aging variable is depicted. The hit ratio for the previous epoch is determined, via step 122. The hit ratio may be determined at or after the end of the previous epoch. The aging variable is then determined based on the hit ratio for the previous epoch, via step 124. Preferably, step 124 increases the aging variable from the previous epoch if the hit ratio is low to provide the aging variable for the next epoch. Also in a preferred embodiment, step 124 may also decrease the aging variable or leave the aging variable unchanged if the hit ratio is very high, indicating that the memory 12 is becoming full.

Figure 5B:
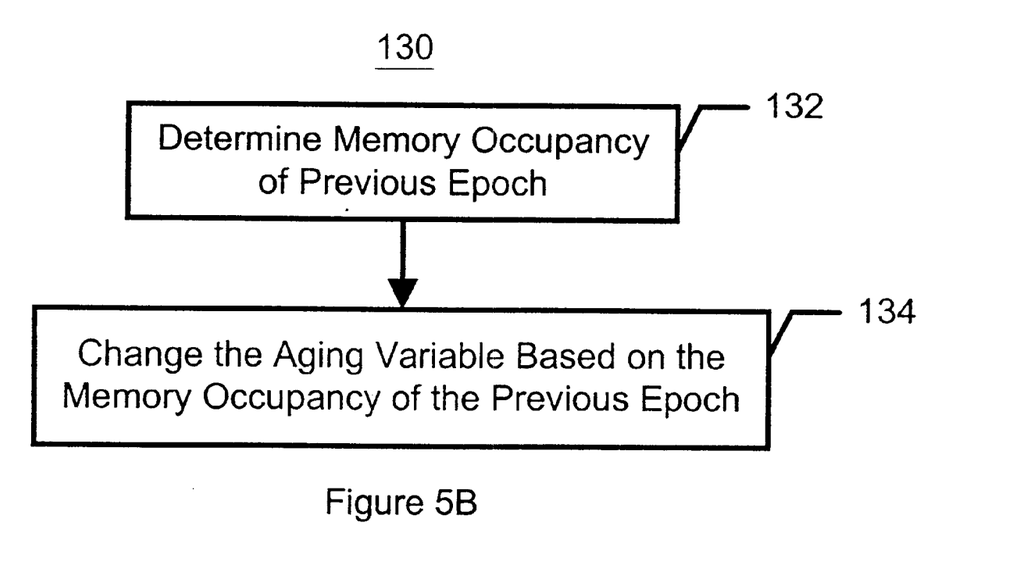
FIG. 5B depicts a second embodiment of a method in accordance with the present invention for determining the aging variable.

Referring to FIG. 5B, a second method 130 for determining the aging variable is depicted. The memory occupancy for the previous epoch is determined, via step 132. Step 132 could be carried out at the end of the previous epoch or at the end of the purge following the previous epoch. The aging variable is then determined based on the memory occupancy for the previous epoch, via step 134. Preferably step 134 increases the aging variable from the previous epoch if the memory occupancy is low to provide the aging variable for the next epoch. Thus, the memory 12 may be allowed to store a greater number of items when the memory occupancy of the previous epoch is low. In a preferred embodiment, step 134 may also decrease the aging variable or leave the aging variable unchanged if the memory occupancy is high, indicating that the memory 12 is becoming full.

Figure 5C:
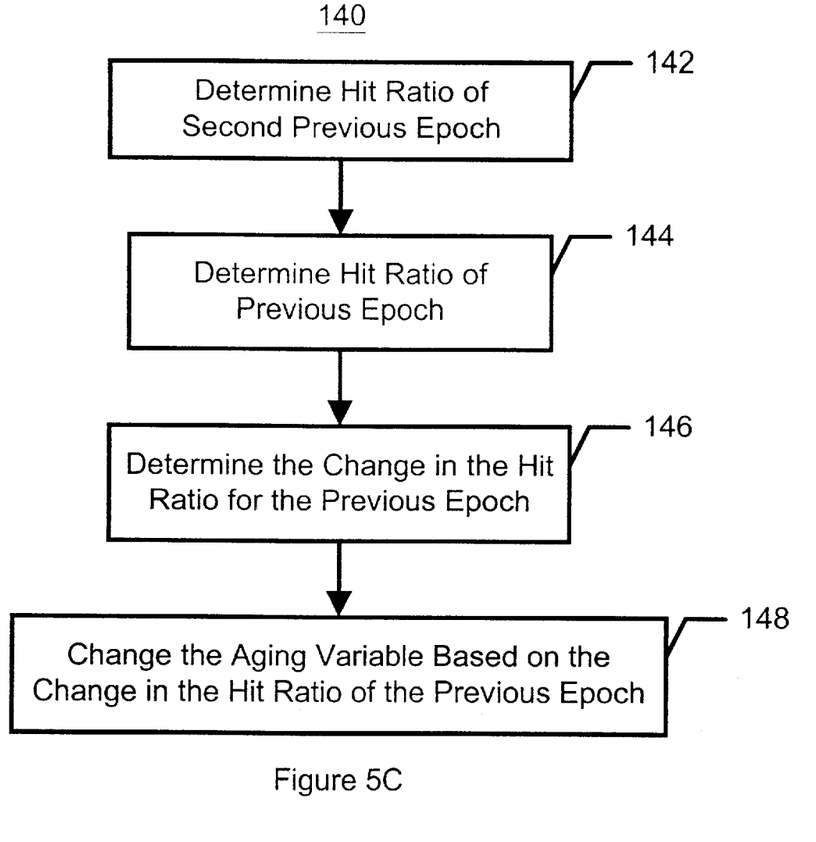
FIG. 5C depicts a third embodiment of a method in accordance with the present invention for determining the aging variable.

Referring to FIG. 5C, a third method 140 for determining the aging variable is depicted. The hit ratio for the second previous epoch is determined, via step 142. The hit ratio may be determined at the end of the second previous epoch. The hit ratio for the previous epoch is determined, via step 144. The hit ratio may be determined at the end of the previous epoch. Thus, using steps 142 and 144 the hit ratios are determined for the two consecutive epochs ending closest to the current time. Referring to FIG. 4, the hit ratios would be determined for the epoch 109 and 110 when the aging variable for the epoch 111 is being calculated. Referring back to FIG. 5C, a change in the hit ratio for the previous epoch is determined, via step 146. Preferably, step 146 is determined by subtracting the hit ratio for the second previous epoch from the hit ratio for the previous epoch. The aging variable is then determined based on the change in the hit ratio for the previous epoch, via step 148. Preferably step 148 increases the aging variable from the previous epoch if the change (increase or decrease) in the hit ratio is high to provide the aging variable for the next epoch. In a preferred embodiment, step 148 may also decrease the aging variable or leave the aging variable unchanged if the change in the hit ratio is low.

Figure 5D:
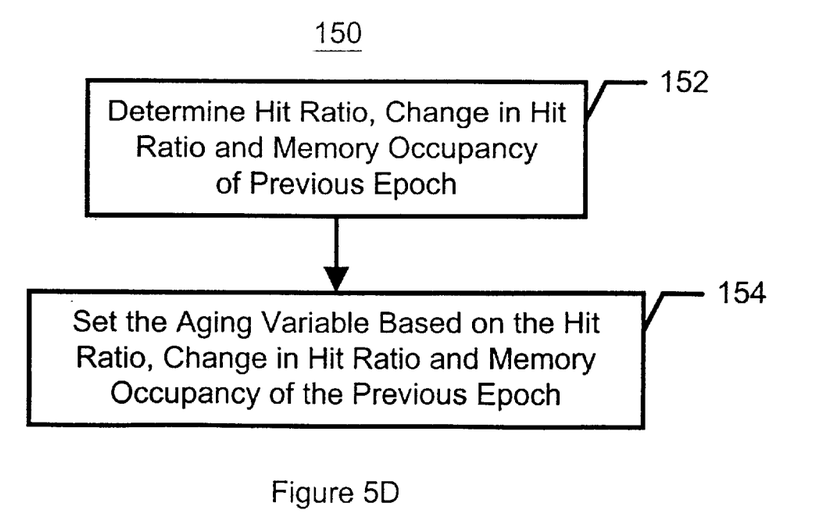
FIG. 5D depicts a preferred embodiment of a method in accordance with the present invention for determining the aging variable.

The methods 120, 130 and 140 depicted in FIGS. 5A–5C can be combined with each other or other aspects of the behavior of the memory 12 in order to provide an aging variable. FIG. 5D depicts a preferred embodiment of a method 150 in accordance with the present invention for determining the aging variable. The hit ratio, change in hit ratio, and memory occupancy for the previous epoch are determined, via step 152. The aging variable for the current epoch is then determined based on the hit ratio, change in hit ratio, memory occupancy and aging variable for the previous epoch, via step 154. In a preferred embodiment, step 154 also determines the aging variable based on a minimum aging variable and a constant aging period, which may be set by the system administrator. The minimum aging variable is the minimum time length for an epoch. The minimum aging variable can be zero. The constant aging period can be considered to be a default aging period. The constant aging period may be the desired aging variable if the aging variable is assumed to be constant. Thus, the constant aging period may be the same as the conventional aging period. The minimum aging period and the conventional aging period can be the same.

In a preferred embodiment, the aging variable determined in the method 150 is the maximum of the minimum aging variable and a first quantity. The first quantity is proportional to the aging variable for the previous epoch plus a second quantity. The second quantity is a product of two constants multiplied by a third quantity and multiplied by a fourth quantity. The third quantity is one minus a memory occupancy of the previous epoch divided by a maximum memory occupancy. The fourth quantity is the maximum of a first signal, a second signal and a third signal. The first signal is one if a hit ratio in the previous epoch is less than or equal to a first predetermined value and zero otherwise. The second signal is a one if there is a change (increase or decrease) between the hit ratio of the second previous epoch and the hit ratio of the previous epoch that is greater than a threshold, and zero otherwise. The third signal is one if the memory occupancy of the previous epoch divided by the maximum memory occupancy is less than a first predetermined quantity and zero otherwise. In other words, the aging variable for the next epoch, $A(t+1)$ is preferably given by:

$$A(t+1)=\max\{A_{min}, B_1 \cdot A(t)+B_2 \cdot A_{const} \cdot (1-C(t)/C_{max}) \cdot \max\{T(h), T(\Delta h), T(C)\}\}$$

Where $A_{min}$ = minimum value for the aging variable
$B_1$ = a positive constant
$B_2$ = another positive constant
$A(t)$ = aging variable for the previous epoch
$A_{const}$ = the constant aging period
$C(t)$ = occupancy of the memory during the previous epoch
$C_{max}$ = maximum possible occupancy of the memory
$T(h)$ = 1 if the hit ratio ($h(t)$) in the last epoch is less than or equal to a constant, such as 0.5, and 1 otherwise
$T(\Delta h)$ = 1 if the absolute value of $h(t)-h(t-1)$ is greater than a constant, such as 0.5, and zero otherwise
$T(C)$ = 1 if $C(t)/C_{max}$ is less than or equal to a constant, such as 0.5, and 1 otherwise Although the algorithm is described in the context of mathematical equations, in a preferred embodiment, there is a granularity to the above-described quantities. For example, the aging variables, $A(t)$ and $A(t+1)$ are preferably with a granularity of within $1/32$ of $A_{const}$. Similarly, $C(t)$ is measured, preferably just before or just after a purge, to a granularity of within $1/32$ of $C_{max}$. Similarly, the equivalence of $h(t)$ and $h(t-1)$ is measured to with $1/32$ when determining $\Delta h$. Furthermore, it is assumed that h, $C(t)/C_{max}$, and $A(t)/A_{const}$ have values between $1/32$ and 1. In a preferred embodiment, if no items are sought during a particular epoch, then the hit ratio of that epoch is defined to be the hit ratio of the previous epoch ($h(t)=h(t-1)$). In other cases, however, the hit ratio takes on its normal definition, the number of items found in the memory 12 divided by the total number of items sought in the memory 12. It has also been determined that the values of 0.875 for $B_1$ and 2 for $B_2$ are preferred.

Thus, using the method 150, the aging variable is at least the minimum aging variable. The amount in which the aging variable from the previous epoch, multiplied by a constant, is increased depends upon the constant aging period. Thus, human experience, in the form of the minimum aging variable and the constant aging period, provides a guide for the aging variable calculated using the method 150.

Furthermore, a term multiplying the aging variable from the previous epoch is positive if the hit ratio is not greater than 0.5, if the memory occupancy is not greater than 0.5 of the maximum occupancy, or if the change in the hit ratio is nonzero. Thus, in the preferred embodiment of the method 150, a hit ratio is low if the hit ratio is not greater than 0.5. Similarly, in the preferred embodiment of the method 150, the memory occupancy is considered to be high if it is greater than half of the maximum memory occupancy. Finally, in the preferred embodiment of the method 150, the change in the hit ratio is low if it is zero. If any of these three signals is one, then the amount of the increase depends upon the constant aging period and the memory occupancy. The amount of the increase is low if the memory occupancy is high because the term $(1-C(t)/C_{max})$ will be small.

In addition, the preferred embodiment of the method 150 is relatively simple to implement. The maximum of the signals $T(h)$, $T(\Delta h)$ and $T(C)$ can be performed by performing a logical OR operation of the signals $T(h)$, $T(\Delta h)$ and T(C). Thus, this operation is relatively simple to implement. The term $0.875*A(t)$ can be performed easily because the term can be performed by shifting the aging variable A(t) by three bits right, which divides the aging variable by eight, and subtracting the resultant from the original A(t). Similarly, the term $2*(1-C(t)/C_{max})$ can be implemented by shifting the term $1-C(t)/C_{max}$ left by one bit. Moreover, the above terms can be relatively easily implemented in a simple, high-speed computer language known as Assembler. Thus, the calculation of the aging variable can be implemented easily and performed relatively rapidly.

Figure 6A:
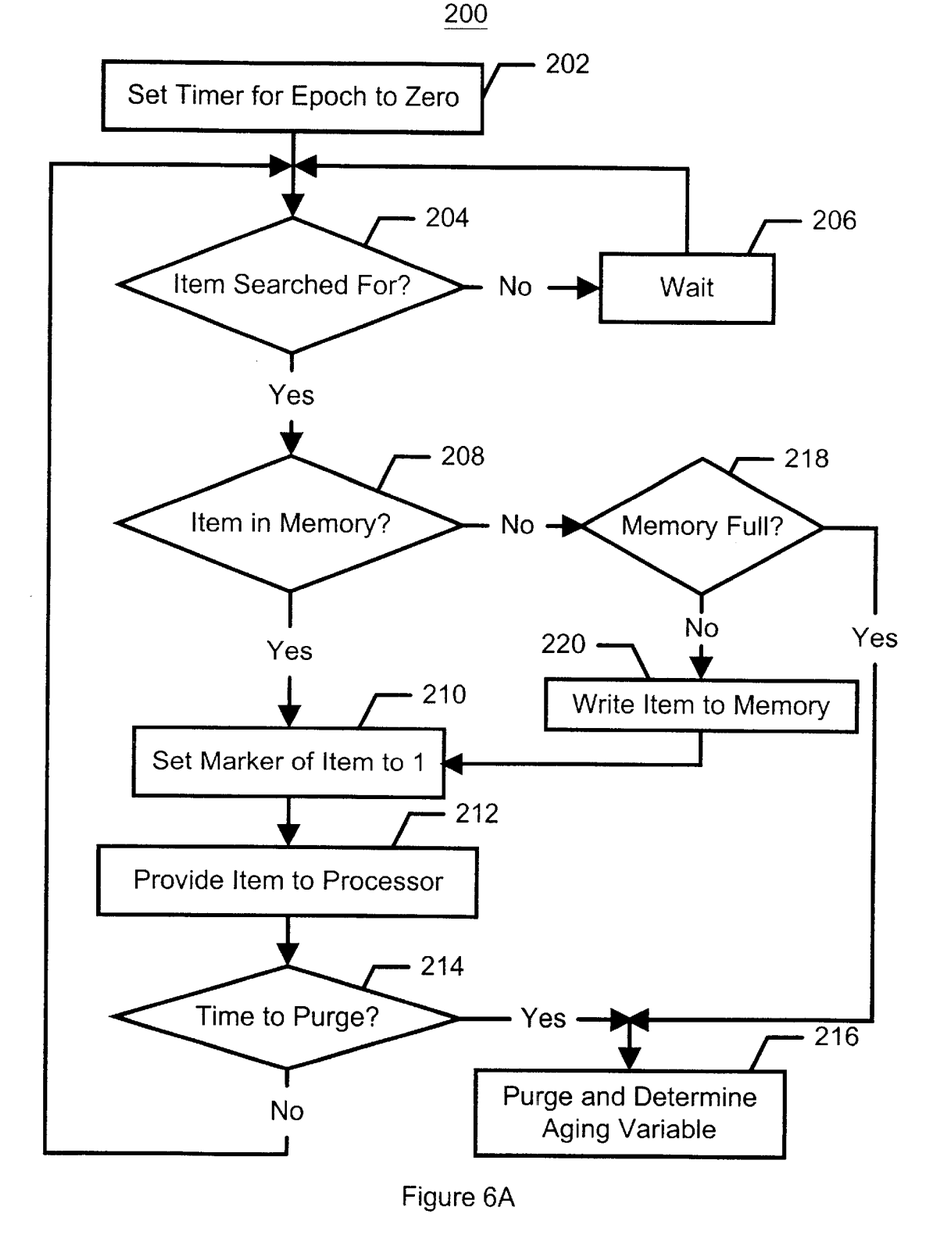
FIG. 6A depicts one embodiment of a method in accordance with the present invention for managing the memory during an epoch.
Figure 6B:
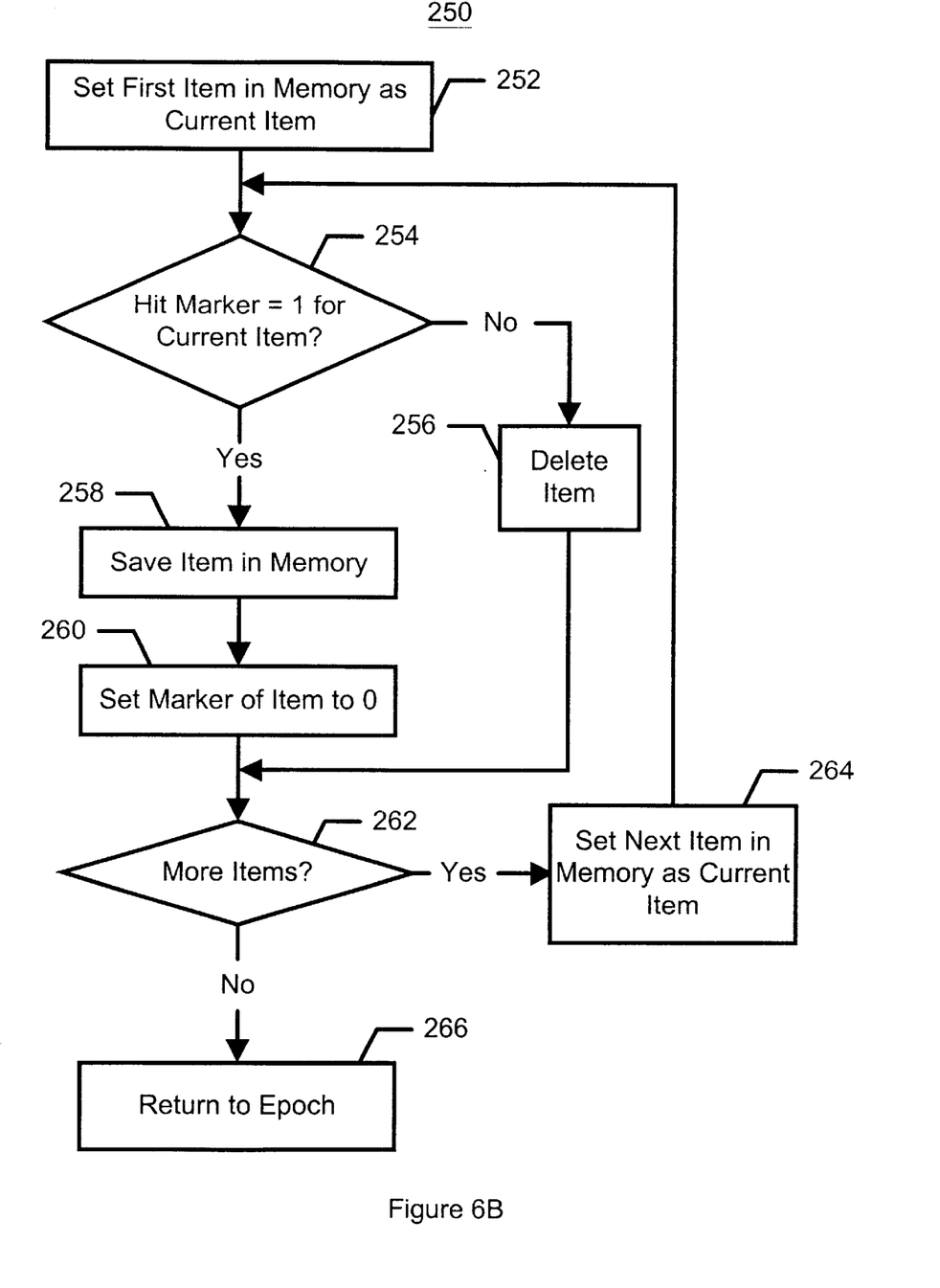
FIG. 6B depicts one embodiment of a method in accordance with the present invention for managing the memory while the memory is purged.

Referring back to FIG. 3, in addition to determining the aging variable in response to the behavior of the memory 12 during the previous epoch, the method 100 purges the memory 12 and operates the memory 12 during an epoch. The purge of the memory 12 preferably removes only those items stored in the memory 12 which were not used in the previous epoch and were not newly added to the memory 12 in the previous epoch. FIGS. 6A and 6B depict embodiments of methods for operating the memory 12 during an epoch and purging the memory 12 only of those items which were not used in the previous epoch and not added in the previous epoch. FIG. 6A depicts one embodiment of a method 200 for operating the memory 12 during an epoch. Thus, the method 200 is preferably used for performing the step 106 of FIG. 3. Referring back to FIG. 6A, the timer for the epoch is set to zero, via step 202. The timer is used to determine when a time period equal to the aging variable for the epoch has expired. It is determined whether an item is searched for in the memory 12, via step 204. If not, then the system waits, via step 206 and returns to the step 204. If the item is searched for, then it is determined whether the item is in the memory, via step 208.

If the item is in the memory, then a marker for the item is set to one, via step 210. The item may also be provided to the processor for use, via step 212. It is determined whether it is time to purge the memory 12, via step 214. Step 214 includes determining whether a time equal to the aging variable for the epoch has expired. If it is not time to purge the memory, then step 204 is returned to. If, however, it is determined in step 214 that it is time to purge the memory, then the memory is purged and the aging variable for the next epoch determined, via step 216. Step 216 preferably returns the system to steps 102 and 104 of the method 100, discussed in FIG. 3.

Referring back to FIG. 6A, if it is determined in step 208 that the item is not in the memory 12, then it is determined whether the memory 12 can store another item, via step 218. In one embodiment, step 218 determines whether the memory 12 is full. If the memory is not full, then the item is obtained from another source and provided to the memory 12, via step 220. Step 210 is then returned to. If it is determined in step 218 that the memory 12 is full, then the memory 12 is purged in step 216, discussed above. Consequently, accelerated purging can be performed for the memory 12. This ensures that the memory 12 does not fill completely.

FIG. 6B depicts one embodiment of a method 250 for purging the memory 12. Thus, the method 250 is preferably used for performing the step 104 of FIG. 3. The method 250 depicted in FIG. 6B is preferably used in conjunction with the method 200 depicted in FIG. 6A. The current item to be reviewed is set to the first item in the memory 12, via step 252. It is determined whether the marker for the current item is one, via step 254. If not, then the item is deleted from the memory 12, via step 256. If, however, the marker for the current item is determined to be a one, then the item is saved in the memory, via step 258. Thus, the item remains in the memory 12. The marker for the item is set to zero, via step 260.

Once the item is deleted or the item saved and the marker for the item set to zero, it is determined whether there are additional items in the memory 12 to be reviewed, via step 262. If there are additional items, the next item in the memory 12 is set as the current item, via step 264. Step 254 is then returned to. If there are no items remaining, then the epoch is returned to, via step 266. Step 266 preferably returns the system 12 to the method 200.

Because the aging variable is set dynamically, in response to the behavior of the memory during the previous epoch, the aging variable can be optimized. In a preferred embodiment, the aging variable is short enough so that the occupancy of the memory 12 remains relatively low, but long enough so that the hit ratio is relatively high. Furthermore, the items not used and not added in the previous epoch are preferably removed in the purging step. Thus, the aging variable and purge allows the items which are repeatedly obtained from the memory 12 to be retained in the memory 12, while items which are not reused are removed from memory. Consequently, the performance of the memory 12 can be improved.

A method and system has been disclosed for performing aging of a memory for a computer system based on the previous performance of the memory. Although the present invention has been described in accordance with the embodiments shown, one of ordinary skill in the art will readily recognize that there could be variations to the embodiments and those variations would be within the spirit and scope of the present invention. For example, although a computer-readable medium is consistent with the present invention and recited in the appended claims, any mechanism for containing or transferring information, particularly a computer program, is considered to be the same as a computer-readable medium. Accordingly, many modifications may be made by one of ordinary skill in the art without departing from the spirit and scope of the appended claims.

What is claimed is:

1. A system for performing aging of a memory in a computer system, the memory containing a plurality of items, system comprising:

means for purging the memory of a portion of the plurality of items each time an epoch equal to an aging variable has expired;

means for providing the aging variable for a new epoch based on a performance of the memory in a previous epoch, including the aging variable of the previous epoch.

2. The system of claim 1 wherein the means for providing the aging variable for the new epoch increases the aging variable from the previous epoch when an occupancy of the memory in the previous epoch is low.

3. The system of claim 1 wherein the means for providing the aging for the new epoch increases the aging variable from the previous epoch when a hit ratio for the memory in the previous epoch is low.

4. The system of claim 1 wherein the means for providing the aging variable for the new epoch increases the aging variable from the previous epoch when a change in a hit ratio for the memory between the previous epoch and an epoch before the previous epoch is high.

5. The system of claim 1 wherein the means for providing the aging variable for the new epoch uses a function of the aging variable for the previous epoch, a hit ratio for the previous epoch, a change in hit ratio between the previous epoch and a next previous epoch, an occupancy of the memory for the previous epoch, a minimum aging variable, a maximum aging variable and some positive constants.

6. The system of claim 1 wherein the portion of the plurality of items in the memory includes those items which were not used or added to the memory during the time period equal to the aging variable.

7. A method for performing aging of a memory in a computer system, the memory containing a plurality of items, the method comprising the steps of:
   (a) purging the memory of a portion of the plurality of items each time an epoch equal to an aging variable has expired; and
   (b) providing the aging variable for a new epoch based on a performance of the memory in a previous epoch, including the aging variable of the previous epoch.

8. The method of claim 7 wherein the step of providing an aging variable (b) further includes the step of:
   (b1) for the new epoch, increasing the aging variable from the previous epoch when an occupancy of the memory in the previous epoch is low.

9. The method of claim 7 wherein the step of providing an aging variable (b) further includes the step of:
   (b1) for the new epoch, increasing the aging variable from the previous epoch when a hit ratio for the memory in the previous epoch is low.

10. The method of claim 7 wherein the step of providing an aging variable (b) further includes the step of:
    (b1) for the new epoch, increasing the aging variable from the previous epoch when an increase or decrease in a hit ratio for the memory in the previous epoch is high.

11. The method of claim 7 wherein the step of providing an aging variable (b) further includes the step of:
    (b1) providing the aging variable for the new epoch based on a function of the aging variable for the previous epoch, a hit ratio for the previous epoch, a change in the hit ratio for the previous epoch and the hit ratio for a next previous epoch, an occupancy of the memory for the previous epoch, a minimum aging value and a maximum aging value.

12. The method of claim 7 wherein step of purging the memory (a) further includes the step of:
    (a1) purging the portion of the plurality of items in the memory which includes those items which were not used or not added to the memory in the time period equal to the aging variable.

13. A computer-readable medium containing a program for performing aging of a memory in a computer system, the memory containing a plurality of items, the program comprising instructions for:
    (a) purging the memory of a portion of the plurality of items each time an epoch equal to an aging variable has expired; and
    (b) providing the aging variable for a new epoch based on a performance of the memory in a previous epoch, including the aging variable of the previous epoch.

14. The computer-readable medium of claim 13 wherein the instructions for providing an aging variable (b) further includes instructions for:
    (b1) for the new epoch, increasing the aging variable from the previous epoch when an occupancy of the memory in the previous epoch is low.

15. The computer-readable medium of claim 13 wherein the instruction for providing an aging variable (b) further includes instructions for:
    (b1) for the new epoch, increasing the aging variable from the previous epoch when a hit ratio for the memory in the previous epoch is low.

16. The computer-readable medium of claim 13 wherein the instruction for providing an aging variable (b) further includes instructions for:
    (b1) providing the aging variable for the new epoch based on the aging variable for the previous epoch, a hit ratio for the previous epoch, a changing hit ratio for the previous epoch, an occupancy of the memory for the previous epoch, a minimum aging value, and a maximum aging value.

17. The computer-readable medium of claim 13 wherein the instructions for purging the memory (a) further includes instructions for:
    (a1) purging the portion of the plurality of items in the memory which includes those items which were not used or not added to the memory in the time period equal to the aging variable.

18. A computer-readable medium containing a program for performing aging of a memory in a computer system, the memory containing a plurality of items, the program comprising instructions for:
    (a) purging the memory of a portion of the plurality of items each time an epoch equal to an aging variable has expired;
    (b) providing the aging variable for a new epoch based on a performance of the memory in a previous epoch, including the aging variable of the previous epoch, wherein the step of providing the new aging variable further includes, for the new epoch, increasing the aging variable from the previous epoch when an increase or decrease in a hit ratio for the memory in the previous epoch is high.

19. A system for performing aging of a memory in a computer system, the memory containing a plurality of items, system comprising:
    means for purging the memory of a portion of the plurality of items each time an epoch equal to an aging variable has expired;
    means for providing the aging variable for a new epoch based on a performance of the memory in a previous epoch, wherein a minimum aging variable is provided and wherein the means for providing the aging variable for the new epoch uses a function of the maximum of the minimum aging variable and a first quantity, the first quantity being proportional to the aging variable for the previous epoch plus a second quantity, the second quantity being a constant multiplied by a third quantity and multiplied by a fourth quantity, the third quantity being one minus a memory occupancy of the previous epoch divided by a maximum memory occupancy, the fourth quantity being the maximum of a first value, a second value, and a third value, the first value being one if a hit ratio in the previous epoch is less than or equal to a first predetermined value and zero otherwise, the second value being one if an absolute value of a change between the hit ratio of a previous epoch and the hit ratio of a next previous epoch is greater than a constant and zero otherwise, and the third value being one if the memory occupancy of the previous epoch divided by the maximum memory occupancy is less than a first predetermined quantity and zero otherwise.

20. A method for performing aging of a memory in a computer system, the memory containing a plurality of items, the method comprising the steps of:

(a) purging the memory of a portion of the plurality of items each time an epoch equal to an aging variable has expired; and (b) providing the aging variable for a new epoch based on a performance of the memory in a previous epoch, wherein a minimum aging variable is provided and wherein the step of providing the aging variable further includes the step of:

(b1) providing the aging variable based on the maximum of the minimum aging variable and a first quantity, the first quantity being proportional to the aging variable for the previous epoch plus a second quantity, the second quantity being a constant multiplied by a third quantity and multiplied by a fourth quantity, the third quantity being one minus a memory occupancy of the previous epoch divided by a maximum memory occupancy, the fourth quantity being the maximum of a first value, a second value, and a third value, the first value being one if a hit ratio in the previous epoch is less than or equal to a first predetermined value and zero otherwise, the second value being one if an absolute value of a change between the hit ratio of a previous epoch and the hit ratio of a next previous epoch is greater than a constant and zero otherwise, and the third value being one if the memory occupancy of the previous epoch divided by the maximum memory occupancy is less than a first predetermined quantity and zero otherwise.

21. A method for performing aging of a memory in a computer system, the memory containing a plurality of items, the method comprising the steps of:

(a) purging the memory of a portion of the plurality of items each time an epoch equal to an aging variable has expired;

(b) providing the aging variable for a new epoch based on a performance of the memory in a previous epoch, including the aging variable of the previous epoch; and (c) marking a second portion of the plurality of items which are used in each time period with a one, while the portion of the plurality of items which are not used in each time period are marked with a zero, and wherein the purging step (a) further includes the steps of (a1) purging the portion of the plurality of items which are marked with the zero and which were not used or not added to the memory in the previous time period; and (a2) marking with the zero the second portion of the plurality of items which were used or added to the memory in the previous time period.

22. A computer-readable medium containing a program for performing aging of a memory in a computer system, the memory containing a plurality of items, the program comprising instructions for:

(a) purging the memory of a portion of the plurality of items each time an epoch equal to an aging variable has expired; and (b) providing the aging variable for a new epoch based on a performance of the memory in a previous epoch, wherein a minimum aging variable is provided and wherein the instructions for providing the aging variable further includes instructions for:

(b1) providing the aging variable based on the maximum of the minimum aging variable and a first quantity, the first quantity being proportional to the aging variable for the previous epoch plus a second quantity, the second quantity being a constant multiplied by a third quantity and multiplied by a fourth quantity, the third quantity being one minus a memory occupancy of the previous epoch divided by a maximum memory occupancy, the fourth quantity being the maximum of a first value, a second value, and a third value, the first value being one if a hit ratio in the previous epoch is less than or equal to a first predetermined value and zero otherwise, the second value being one if an absolute value of a change between the hit ratio of a previous epoch and the hit ratio of a next previous epoch is greater than a constant and zero otherwise, and the third value being one if the memory occupancy of the previous epoch divided by the maximum memory occupancy is less than a first predetermined quantity and zero otherwise.

23. A computer-readable medium containing a program for performing aging of a memory in a computer system, the memory containing a plurality of items, the program comprising instructions for:

(a) purging the memory of a portion of the plurality of items each time an epoch equal to an aging variable has expired;

(b) providing the aging variable for a new epoch based on a performance of the memory in a previous epoch, including the aging variable of the previous epoch; and (c) marking a second portion of the plurality of items which are used or added to the memory in each time period with a one, while the portion of the plurality of items which are not used or not added to the memory in each time period are marked with a zero, and wherein the instructions for purging (a) further includes instructions for (a1) purging the portion of the plurality of items which are marked with the zero; and (a2) remarking with the zero the second portion of the plurality of items which were marked with a one because the second portion of the plurality of items were used or added to the memory in the previous time period.

* * * * *